United States Patent [19]

Bruhnke et al.

[11] Patent Number: 4,470,717
[45] Date of Patent: Sep. 11, 1984

[54] WEB SEAM FOR SHEET-METAL PARTS AND METHOD FOR PRODUCING THE SAME

[75] Inventors: Ulrich Bruhnke, Ehningen; Bernd Harloff, Böblingen; Roman Schöppel, Sindelfingen; Engelbert Kinds, Ehningen, all of Fed. Rep. of Germany

[73] Assignee: Daimler-Benz Aktiengesellschaft, Fed. Rep. of Germany

[21] Appl. No.: 516,668

[22] Filed: Jul. 25, 1983

Related U.S. Application Data

[63] Continuation of Ser. No. 271,357, Jun. 8, 1981, abandoned.

[30] Foreign Application Priority Data

Jun. 7, 1980 [DE] Fed. Rep. of Germany ....... 3021529

[51] Int. Cl.³ .................. B23K 11/10; F16B 5/08
[52] U.S. Cl. .................. 403/271; 219/91.2; 228/136; 228/173 C
[58] Field of Search ............... 228/136, 137, 173 C, 228/175; 219/91.2; 403/271, 270

[56] References Cited

U.S. PATENT DOCUMENTS

| | | | |
|---|---|---|---|
| 1,933,484 | 10/1933 | Ragsdale | 219/91.2 |
| 3,132,236 | 5/1964 | Deininger | 219/91.2 |
| 4,072,787 | 2/1978 | Ricks | 228/175 X |
| 4,352,003 | 9/1982 | Arnoldt | 219/91.2 X |

FOREIGN PATENT DOCUMENTS

855235 11/1952 Fed. Rep. of Germany .

*Primary Examiner*—Kenneth J. Ramsey
*Attorney, Agent, or Firm*—Craig & Burns

[57] ABSTRACT

A web seam for sheet metal parts and a process for producing the same wherein the web seam is provided with a triple layer web projecting from a surface of the sheet metal parts, the layers are formed from a first flange of one sheet metal part and a second flange of the other sheet metal part. The first flange and a portion of the second flange immediately adjoining the other sheet metal part are separately connected by spot welds or by cementing in an intermediate step. The projecting edge of the second flange is then folded over in a U-shape and extends over the first flange. Additional weld spots or cement are applied to the web seam, which weld spots or cement simultaneously cover all three layers. A bight portion joining the first leg and a second leg of the U-shaped flange has a bending diameter which is larger than a single thickness of the sheet metal and, preferably, is twice the sheet metal thickness.

9 Claims, 9 Drawing Figures

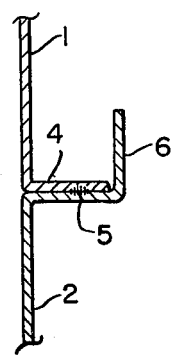
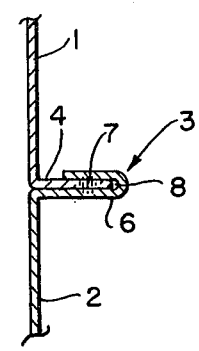
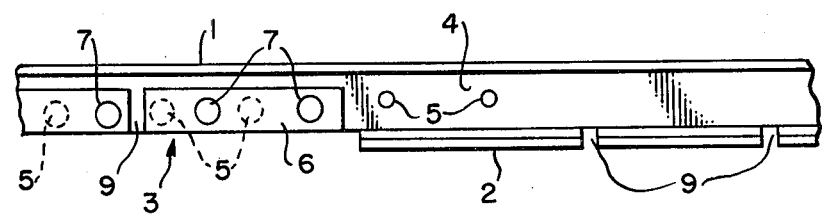
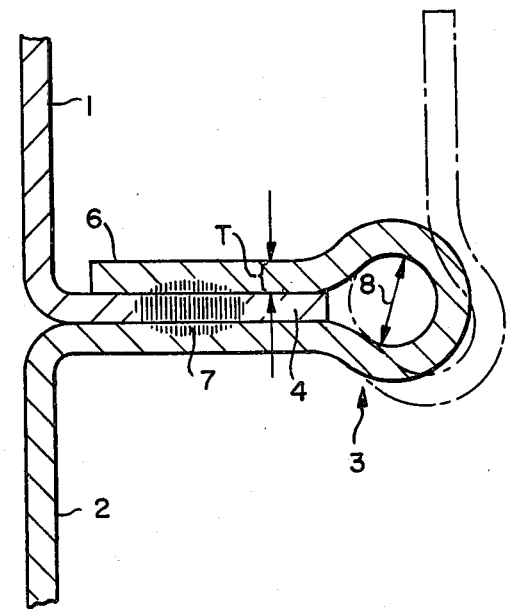

WEB SEAM FOR SHEET-METAL PARTS AND METHOD FOR PRODUCING THE SAME

This is a continuation of application Ser. No. 271,357, filed June 8, 1981, now abandoned.

BACKGROUND OF THE INVENTION

The present invention relates to a seam arrangement and, more particularly, to a web seam for sheet-metal parts and the process of making the same. The seam is formed by a triple layer web projecting from a surface of the sheet metal part, with the respective layers being formed from a first flange of one sheet metal part and a second flange of another sheet metal part. The second flange is folded over in a U-shape and extends over the first flange with the first flange and a leg of the U-shaped second flange initially joining the sheet metal parts by their being separately connected by spot welding or cementing. The final securement of the flange involves the welding or cementing of both legs of the U-shaped flange to the first flange.

A web seam in an intermediate step in the manufacture of a vehicle roof rain channel is proposed in German Pat. No. 855,235, wherein a curved roof panel with a flange is first tack welded by means of an electric spot welding to a portion of a Z-shaped roof frame of a motor vehicle body. Then by bending a projecting over hanging flange of the roof frame over the the flange of the roof panel, a roof edge is obtained having three times the sheet metal thickness.

In a web seam according to the above-noted German patent, especially with the use of thin-walled sheet metal, if such sheet metal joint is placed under tensile stress at right angles to the web seam, the spot weld connections begin to tear the sheet metal as the seam is pulled open at a relatively low stress since a brittle zone is formed about each spot weld. This is due to the fact that the brittle zone cannot absorb any appreciable load, especially with thin walled metal sheets. Consequently, when the weld seam is subjected to a stress which tends to bend the seam open, the weld spots tear through the sheet metal and "unbuttoned", so to speak.

SUMMARY AND OBJECTS OF THE INVENTION

The aim underlying the present invention essentially resides in providing a high strength web seam and a method of producing such seam for thin-walled sheet metal joints, which seam withstands high peak loads and has a high energy absorption capacity.

In accordance with advantageous features of the present invention, weld spots secure the triple layer web in the finished configuration, which weld spots attack all three layers simultaneously. An intermediate step in construction includes the spot welding of a first flange to a portion of a second flange prior to the second flange being formed into a generally U-shaped configuration and the welding of the triple layer web.

Advantageously, and in accordance with the process of the present invention, the flange of the first sheet metal part is tacked onto an approximately twice as thick flange of a second sheet metal part, with a projecting portion of the second flange being thereafter folded back onto a rear side of the first flange. The web seam is then welded together by spot welding, with the spot welding penetrating and securing all three layers.

By virtue of the above-noted features of the present invention, a folded seam is obtained having different bonds extending across two and across three layers of a multilayer joint. The first band accross double layers is, applied as a tacking and serves essentially for stabilizing the seam during the folding over of the third layer of ply, i.e., the projecting portion of the second flange. Once the triple layer has been welded a bond is provided which has increased seam strength and high energy absorbing power.

With the weld seam of the present invention, upon the application of tensile stresses at right angles to the weld seam, only the bonds between two layers of the web would initially be torn apart or severed while the bonds between the other two layers are still maintained. In situations where tensile stresses are applied over a long time period or are of a greater magnitude, the three bent portions of the web seam are pulled into a stretched position or condition. In a final stage of a stressing process, subsequent to the seam being pulled into a stretched condition, the existing bonds are placed under a shear stress and thus withstand a high peak load which is about three and one half times greater than the peak loads which a double layer spot weld seam is capable of withstanding.

Advantageously, and in accordance with further features of the present invention, the second spot welds of a spot welded seam may lie approximately along a same line as the first spot welds so that all weld spots are simultaneously load bearing in case a stress is exerted on the seam.

Additionally, a folded-back projection portion of the second flange may, in accordance with the present invention, be provided with cross cut outs or notches at a spacing corresponding to a pitch gap of the weld spots. Consequently, only relatively short flange lengths need to be worked in one operating cycle with such flange lengths, in a case of joining relatively large parts, being located in a series at intervals along an extension of the weld seam and selectively folded over section by section. The thus-produced triple layer flange is connected by weld spots, section by section, until the spot welded web seam extends over the entire component. By a subdivision of the projecting portion into small sections, only relatively small forces are required for the folding of each section thereby facilitating the formation of a long web seam.

Moreover, in accordance with the present invention, a bending diameter of the folded back over hang or projecting portion may be larger than a single-sheet thickness and, preferably, is twice the sheet metal thickness since when using a moderately strong cold forming technique, the energy absorption capacity of the material is less greatly impaired.

Since only small forces are required for producing the sectional and progressively serially formed web seam of the present invention, the apparatus for producing such seam may be fashioned, for example, as a seam-welding robot, wherein the required electrode force can simultaneously be utilized as a force for compressing the fold. Moreover, a larger bending diameter of the folded-back sheet metal overhang or projecting portion has a positive effect on the strength of the web seam.

In the process for producing the triple-layer spot weld web seam, the flange of the first sheet metal part is tacked onto the flange of the second sheet metal part, which flange is approximately twice as wide so as to enable the projecting portion of the second flange to be thereafter folded back onto a rear side of the first flange.

In accordance with further advantageous features of the process of the present invention, the rearward or backward folding may be effected in sections in accordance with a progression of the operation during spot welding.

Folded flanges produced in accordance with the process of the present invention may be economically and advantageously used, for example, especially in the construction of motor vehicle bodies, due to a higher load bearing capacity of the spot welds.

Additionally, in accordance with the present invention, the second sheet metal part may be provided, while being punched out as a sheet metal blank, with the cross cut outs or notches at the edge forming the overhang or projecting portion of the second flange. These cross cut outs may correspond to an operating cycle distance of the welding tool. Within one cycle, the flange of the second metal sheet is tacked, while the overhang or projecting portion is folded back in a preceding section and the triple layer spot welding operation is performed.

In lieu of welding the seam, it is also possible to effect a tacking by, for example, adhesives or cementing and, in this case, it is possible to utilize epoxy resin, PVC adhesives, or polyurethane adhesives.

Accordingly, it is an object of the present invention to provide a web seam and method of producing such seam which avoids, by simple means, shortcomings and disadvantages encountered in the prior art.

Another object of the present invention resides in providing a web seam for sheet metal parts which is simple in construction and therefore relatively inexpensive to manufacture.

Yet another object of the present invention resides in providing a process for producing a web seam for sheet metal parts which may be carried out in an economical and efficient manner.

A further object of the present invention resides in providing a weld seam for sheet metal parts which is capable of withstanding high peak loads and has a high energy absorption capacity.

Yet a further object of the present invention resides in providing a spot weld web seam for sheet metal which when subjected to tensile stresses at generally right angles thereto tends to open by bending and then tearing of the spot welds through the sheet metal.

These and other objects, features, and advantages of the present invention will become more apparent from the following description when taken in connection with the accompanying drawing which shows, for the purposes of illustration only, one embodiment in accordance with the present invention, and wherein:

BRIEF DESCRIPTION OF THE DRAWINGS

FIG. 1 is a cross sectional view of a spot welded web seam constructed in accordance with the present invention for thin-walled sheet metal parts, in a semi-finished stage, tacked by spot welds;

FIG. 2 is a cross sectional view of the spot welded web seam of FIG. 1 in a finished stage;

FIG. 3 is a top view of spot welded web seam in a sectionally progressing manufacturing mode;

FIG. 4 is an enlarged cross sectional view of spot welded web seam in accordance with the present invention showing a bending diameter which is greater than the flange thickness.

DESCRIPTION OF THE PREFERRED EMBODIMENT

Figure 5:
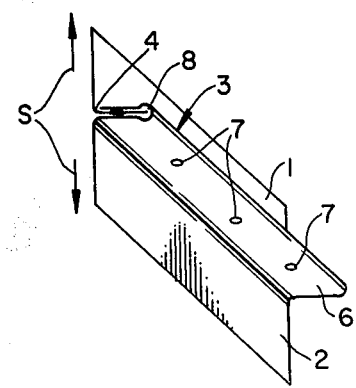
FIGS. 5-9 show progressive stages of energy absorption of a web seam according to the instant invention when tensile stress of a magnitude capable of causing deformation is incurred.

Referring now to the drawing wherein like reference numerals are used throughout the several views to designate like parts and, more particularly to FIGS. 1 and 2, wherein according to these figures, a spot weld web seam for thin-walled sheet metal parts 1, 2, is shown. The seam includes a triple layer web generally designated by the reference numeral 3 projecting from a surface of the joined parts 1, 2 including a first flange 4 of one sheet metal part 1 and a second flange 6 of the other sheet metal part 2. The second flange 6 preferably has twice the width of the first flange 1 and is tacked to the first flange 4 by means of a series of spot welds 5 or by a suitable adhesive. An overhang of the second flange 6 extending beyond a free end of the flange 4 is subsequently folded back in a U-configuration onto the first flange 4 and joined to the first flange 4. The joining of the folded back over portion of the second flange 6 to the first flange 4 is accomplished by a series of weld spots 7 which connects all three layers of the sheet metal, with the spot welds 7 being arranged, if the first weld spots are used, preferably in series with the first spot welds 5.

During a backward or rearward bending of the second flange 6, a bending diameter 8 may be maintained larger than a single thickness T of the sheet metal parts 1, 2. Preferably, this bending diameter is twice the thickness T. It is understood that in vehicle bodies, the sheet metal parts are usually of the same gauge of steel. However, the same may be used with parts having different thicknesses, wherein the bending diameter is preferably twice the thickness of the intermediate flange, i.e., flange 4.

For relatively large sheet metal parts, the second sheet metal part 2, while being punched out as a blank, may, as shown most clearly in FIG. 3, be provided with cross cut outs or notches 9 at the projecting or overhanging portion of the flange 6 so as to enable a formation of the web seam to take place in a sectionally progressing fashion. After providing tack spot welds 5 or after gluing the parts 1 and 2 together by a suitable adhesive, another operating cycle section or distance is tacked while, in the first already tacked section, the projecting or overhanging portion of the second flange 6 is folded back into a U-shape onto the first flange 5 and attached by spot welds 7 which connect all three layers of the sheet metal. A compressing of the rearward folded projecting portion of the flange 6 can be effected in the arrangement of the present invention by the welding electrodes which perform the spot welds 7. After completing a welding operation by providing the spot welds 7, the weld-seaming tool, which may be arranged in an industrial robot, is shifted by one section.

Figure 6:
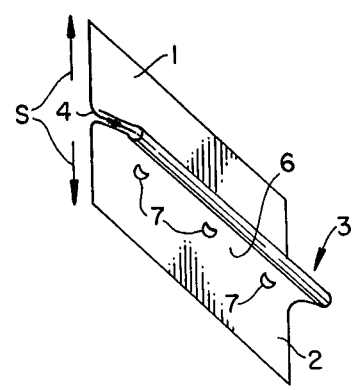
Figure 7:
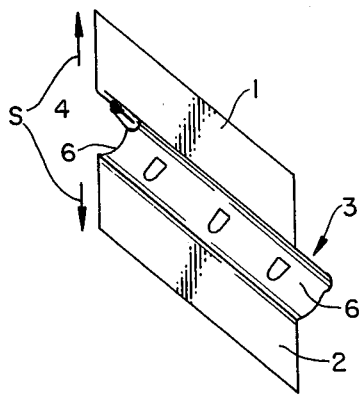
Figure 8:
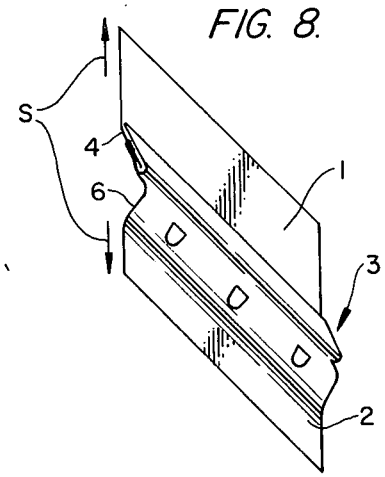
Figure 9:
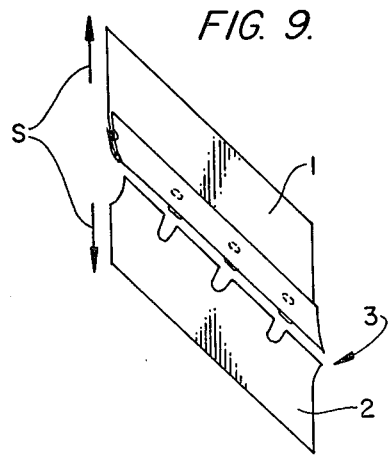

Referring now to FIGS. 5-9 wherein a seam according to the instant invention, subjected to tensile stresses, is shown in sequential stages of deformation to tensile stress. The tensile stress is depicted by arrows extending in opposite directions and designated by S. In FIG. 5, the seam is under stress but at this instant undeformed. As deformation begins due to the stress exceeding the bend strength of the steel (see FIG. 6), the spot welds begin to tear through the sheet metal and the folds in the sheet metal begin to open. As seen in FIG. 6, the seam begins pulling open where flange 6 and flange 4 first abut. Referring to FIG. 7, it is seen therein that, as the tensile stress continues to be applied, the spot welds continue to tear through the sheet metal forming that portion of flange 6 which was first abutted against flange 4. Subsequent to the spot welds tearing through the sheet metal as described above, the seam will then tend to be straightened out, as somewhat depicted in FIG. 8. As seen in FIG. 9, the seam has been straightened and the continued application of the tensile stress ultimately causing the sheet metal to fracture generally in the vicinity of the bight portion of the U-shaped formed by the flange 6 when it was folded over. The fracturing or tearing which ultimately separates the two sheet metal parts is somewhat prolonged or delayed when the seam has been formed with a bend diameter which is at least twice the thickness of the flange which is interposed between the folded over portions of flange 6.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A web seam for components formed of sheet-like material having a three-layer web projecting from the surface of an assembly formed by the joining of two components, the layers of said web including a first flange formed as part of one of the components and a second flange formed as part of the other component, said second flange being bent in a U-shape and extending along both sides of said first flange, said U-shape second flange having a bending diameter which is larger than a single thickness of said second flange, said first flange and a first portion of the second flange bordering directly on the other component being connected by a first connecting means, second connecting means for connecting all three layers of the web at the same general location, said components, in the seam area, border on one another in a generally aligned manner and the web extends generally perpendicular to the assembly formed by said components.

2. A web seam according to claim 1, wherein the first connecting means includes a plurality of spot welds disposed along a length of the first flange and the first portion of the second flange and wherein the second connecting means includes a plurality of spot welds simultaneously welding all three layers of the web together, the spot welds of said first connecting means being generally along a seam line as the spot welds forming the second connecting means.

3. A web seam according to claim 1, wherein the first connecting means is an adhesive disposed along at least portions of the first flange and the first portion of the second flange.

4. A web seam according to claim 1 wherein a second portion of the second flange is provided with a plurality of axially spaced cut outs, the cut outs being spaced from each other by a distance corresponding to a pitch gap of the second connecting means which connects all three layers of the web together.

5. A web seam according to claim 4, wherein the bending diameter is equal to twice the thickness of the second flange.

6. A web seam according to claim 5 wherein the second flange has a width which is approximately twice a width of the first flange.

7. A web seam according to claim 1, wherein the bending diameter is at least twice the thickness of the first flange.

8. A web seam as set forth in slaim 1, wherein said components are made of sheet metal.

9. A web seam as set forth in claim 8, wherein said first connecting means includes a plurality of spot welds and said second connecting means includes a plurality of spot welds.

* * * * *